Nov. 20, 1962 E. W. ALLARDT 3,065,329
APPARATUS FOR FORMING A MULTIPLE TUBE PANEL
Filed Nov. 5, 1956 6 Sheets-Sheet 1

INVENTOR
Ernst W. Allardt
BY
J. P. Moran
ATTORNEY

Nov. 20, 1962     E. W. ALLARDT     3,065,329
APPARATUS FOR FORMING A MULTIPLE TUBE PANEL
Filed Nov. 5, 1956     6 Sheets-Sheet 4
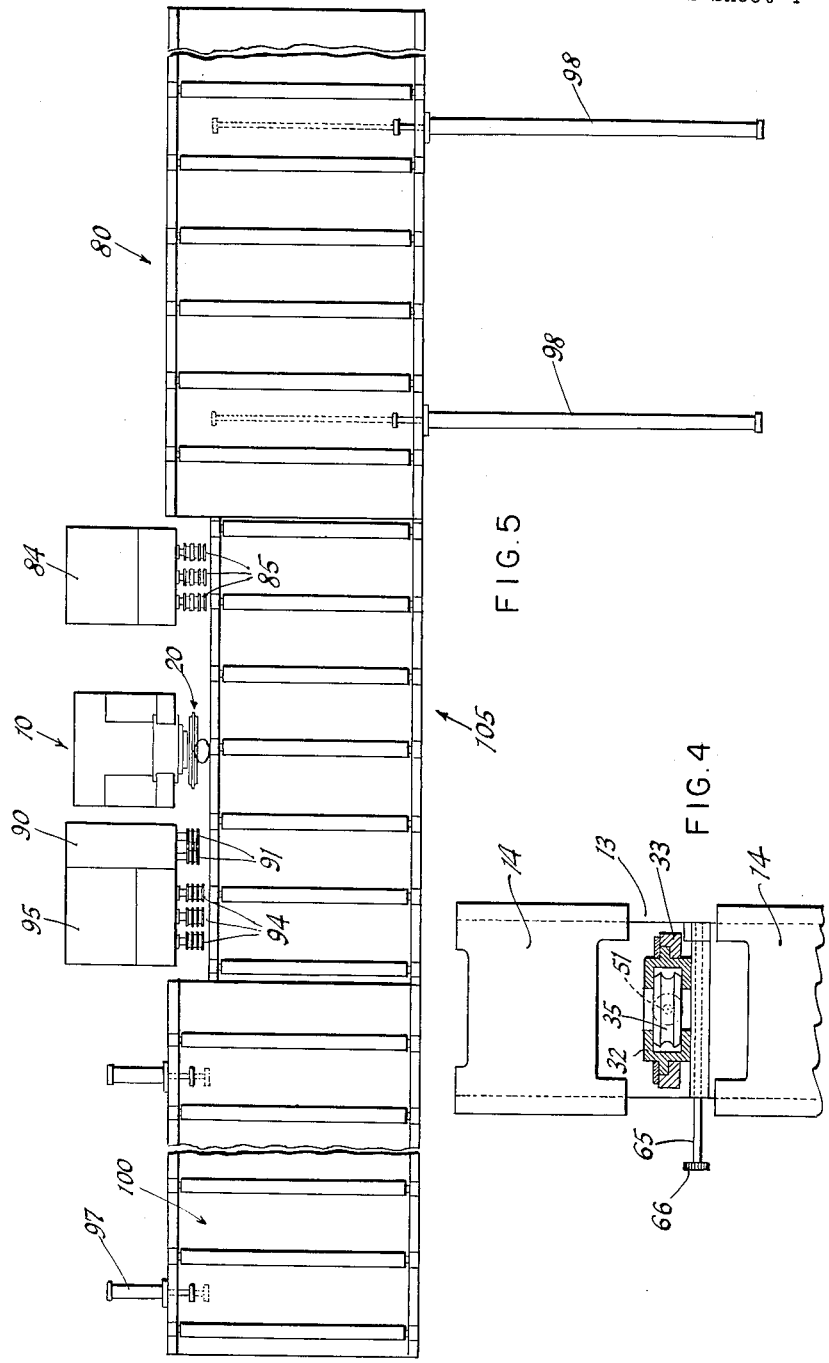
INVENTOR
*Ernst W. Allardt*
BY
ATTORNEY Nov. 20, 1962 E. W. ALLARDT 3,065,329
APPARATUS FOR FORMING A MULTIPLE TUBE PANEL
Filed Nov. 5, 1956 6 Sheets-Sheet 5

INVENTOR
*Ernst W. Allardt*
BY
*J. P. Moran*
ATTORNEY

United States Patent Office 3,065,329
Patented Nov. 20, 1962

3,065,329
APPARATUS FOR FORMING A MULTIPLE TUBE PANEL
Ernst W. Allardt, Alliance, Ohio, assignor to The Babcock & Wilcox Company, New York, N.Y., a corporation of New Jersey
Filed Nov. 5, 1956, Ser. No. 620,424
5 Claims. (Cl. 219—102)

This invention relates to tube panels or walls, forming components of a heat exchanger, and to a novel method of making such panels or walls. More particularly the invention is directed to an impervious or pressure-tight tube panel or wall comprising a plurality of metal tubes held in relatively closely spaced and substantially parallel relation by interposed web or spacer strips electric resistance welded along opposite longitudinal edges to adjacent tubes, and to apparatus for, and a method of, forming such panels or walls by electric resistance welding.

Many vapor generating installations have furnaces, or other portions subjected to high temperature gases, enclosed by water walls formed of generally upright tubes supplied with fluid for vapor generation by absorption of heat from the gases. These tubes are relatively closely spaced and frequently closely studded to provide a substantially continuous heat absorbing surface. Interspaces are packed with refractory to provide a substantially impervious enclosure.

However, it is necessary, in order to provide a leak-tight and pressure-tight enclosure, to enclose these walls in an outer metal casing or skin secured to the walls by bolting, spot welding, or the like, and this casing represents a substantial expense in the cost of the vapor generator. This expense could be eliminated by a leak-tight and pressure-tight water wall construction.

As a proposed solution, it has been suggested that tube panels or walls be formed by welding the tubes to each other, either directly or by connecting or spacer strips welded between adjacent tubes, and such panels have actually been formed by fusion welding techniques.

However, fusion welding, particularly of the arc welding type, is characterized by relatively high temperatures sufficient to melt substantial portions of the metal at the joints. These high temperatures result in relatively large heat affected zones in the welded members, with correspondingly increased distortion in the parts as-welded. Relatively extensive and expensive post-weld heat treatment is required to effectively reduce or eliminate the locked-in stresses. In the particular example of fusion weld uniting closely spaced tubes by a spacer strip or web, extensive working of the welded structure is generally necessary to re-shape the same to a flat or planar state with the interconnected tubes being rectilinear.

Fusion welding techniques also are not as readily adapted to production line operations as are other welding techniques because of their slow speed of operation. To overcome this handicap, a multiplicity of welding heads have to be employed, which greatly adds to complexity of the operation.

In accordance with the present invention, a tube panel or wall is provided comprising a plurality of closely laterally spaced, and relatively elongated metal tubes integrally united into a leak-tight and pressure-tight structure by interposed metal webs or spacer strips electrical resistance welded along opposite longitudinal edges to adjacent tubes.

The apparatus for forming the tube panels or walls comprises two pairs of co-axial rotary electric resistance welding electrodes, the electrodes of each pair being mounted in juxtaposed electrically insulated relation and connected to opposite polarity terminals of a source of welding potential with each pair of electrodes preferably being connected to opposite terminals of a different transformer secondary winding. The two pairs of electrodes are arranged in vertically adjacent relation with correspondingly located electrodes of the two pairs being in substantial alignment vertically and laterally and at the same relative polarity.

Each electrode has an outwardly concave curved tube engaging peripheral surface, the tube engaging surfaces of laterally adjacent coaxial electrodes thus diverging toward the electrode axis. Thereby, the electrodes of the upper pair engage the upper inner quadrants, and those of the lower pair the lower inner quadrants, of a pair of tubes fed in laterally spaced relation between the two pairs of electrodes. However, the minimum peripheral spacing of vertically aligned electrodes is in excess of the thickness of a metal web or strip fed between the tubes, so that the electrodes contact only the tubes and not the strip.

Thereby, the resistance welding current flows from one electrode of each pair into one tube, through or across the strip, into the other tube and out through the other electrode of each pair. By using two pairs of electrodes, one above the strip and the other below the strip, and dividing the total welding current substantially equally between the two pairs, the welding current is distributed substantially uniformly throughout the depth of the strip, resulting in uniformly good resistance welds across the entire vertical extent of the contacting surfaces.

A guiding means, preferably in the form of a roller conveyor or the like, is provided to feed pairs of tubes to guiding rollers or the like in advance of the electrodes. Other guiding means extend substantially to the common axial plane of the two pairs of electrodes to guide the metal web or strip between the tubes, preferably at or adjacent the common diametrical plane thereof. The tube guiding rollers are so arranged as to feed one tube rectilinearly to the electrodes and the other tube in converging relation to such one tube so that both tubes contact the strip edges substantially only when they engage the electrodes. Thereby, a resistance welding circuit is completed only as the tubes and strip enter the welder.

Squeeze roll means are provided to forcibly press the tubes against the strip edges as the resistance welding current flows through the assembly of tubes and strip. The squeeze roll means include a single squeeze roll mounted on a substantially vertical axis and engaging the outer periphery of one tube, and a pair of squeeze rolls rotatable in planes diverging at substantially 45° to the horizontal and vertical and engaging the outer periphery of the other tube. The single squeeze roll has a concave periphery conformingly engaging substantially the entire outer periphery of the one tube between the upper and lower electrodes. One of the pair of squeeze rolls engages the upper outer quadrant of the other tube and the other of the pair of squeeze rolls engages the lower outer quadrant thereof. However, the minimum spacing of the peripheries of the paired squeeze rolls is at least equal to the thickness of the web or strip, for clearing the latter as additional tubes and strips are electric resistance welded to the initially joined tube and strip assembly.

The joined tubes and strip leaving the welder pass through a set of straightening and pull out rolls onto a laterally shiftable roller conveyor. The latter shifts the tube and strip assembly laterally to clear the welder for return to the first conveyor. The first conveyor is also laterally shiftable to re-align one tube of the assembly with the welder for passage therethrough with an added strip and tube to extend the panel laterally. The previously welded strip passes between the paired squeeze rolls with the other tube joined thereto passing outside these squeeze rolls.

In practicing the method of the invention, a first pair of tubes are joined to a strip by electric resistance welding by the described apparatus. This first pair of joined tubes is then returned to substantially its starting position, but offset laterally thereof by the amount of the inter-tube spacing. The joined first pair of tubes, a second strip, and a third tube are then fed to the welder, with the third tube, the strip, and one of the first pair of tubes being resistance welded to each other, the other tube of the first pair passing outside the welder and the initial web or strip clearing the spaced paired squeeze rolls. The sequence is then repeated until a panel of the desired width has been formed. Preferably, to avoid distortion in the plane of the panel, successive tubes are added to alternate sides of the panel, thereby equalizing any distortion, in the plane of the panel, as might occur if all the tubes were added successively to the same side of the panel. Such alternate side extension may be effected, for example, by turning the panel over between successive passes through the welder.

For an understanding of the invention principles, reference is made to the following description of a typical embodiment thereof as illustrated in the accompanying drawing. In the drawing:

FIG. 4 is a front elevation view, partly in section, of the adjustable mounting of one squeeze roll;

FIG. 5 is a plan view of tube panel or wall forming apparatus incorporating the welder;

Figure 1:
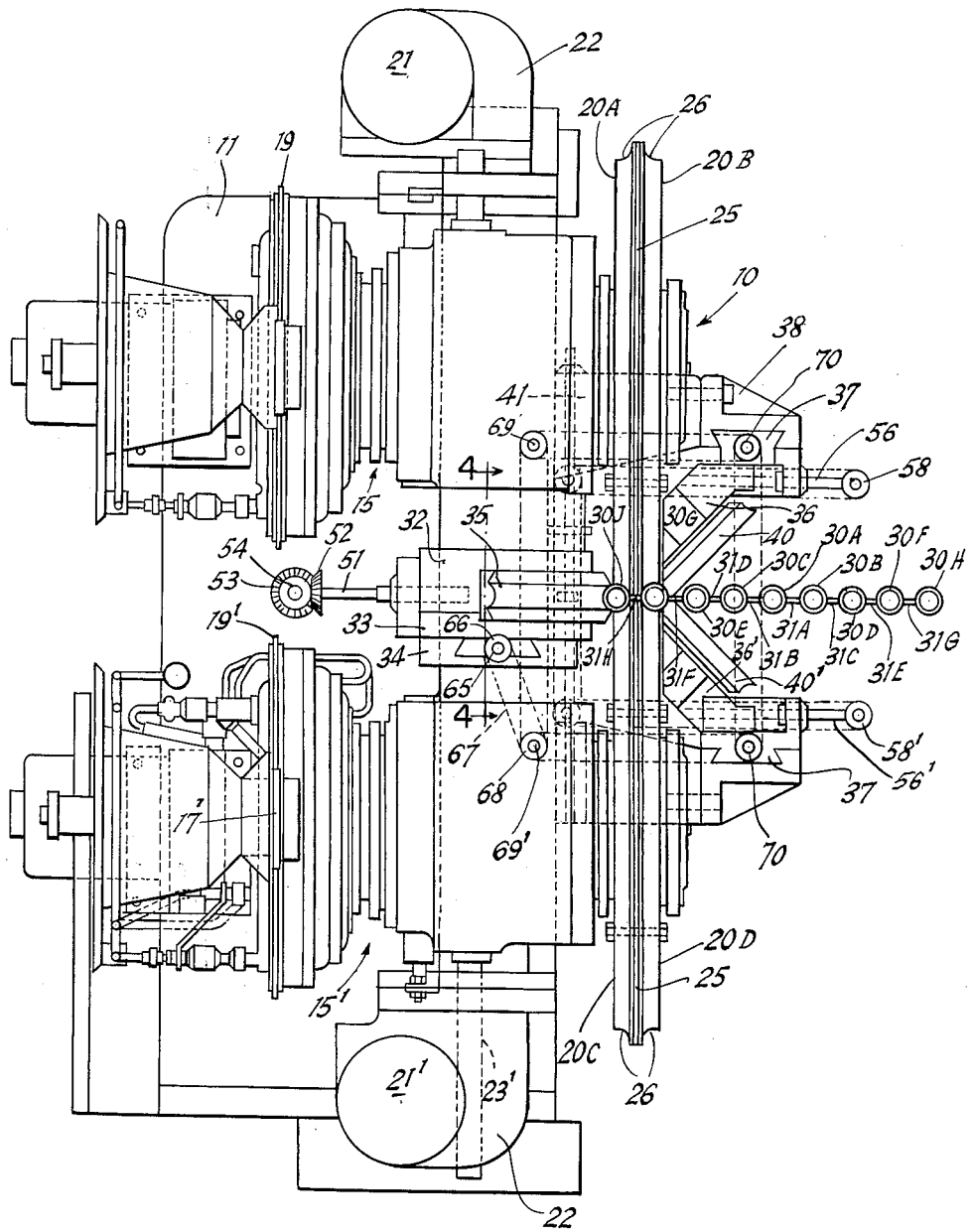
FIG. 1 is a side elevation view of an electric resistance welder embodying the invention.
Figure 2:
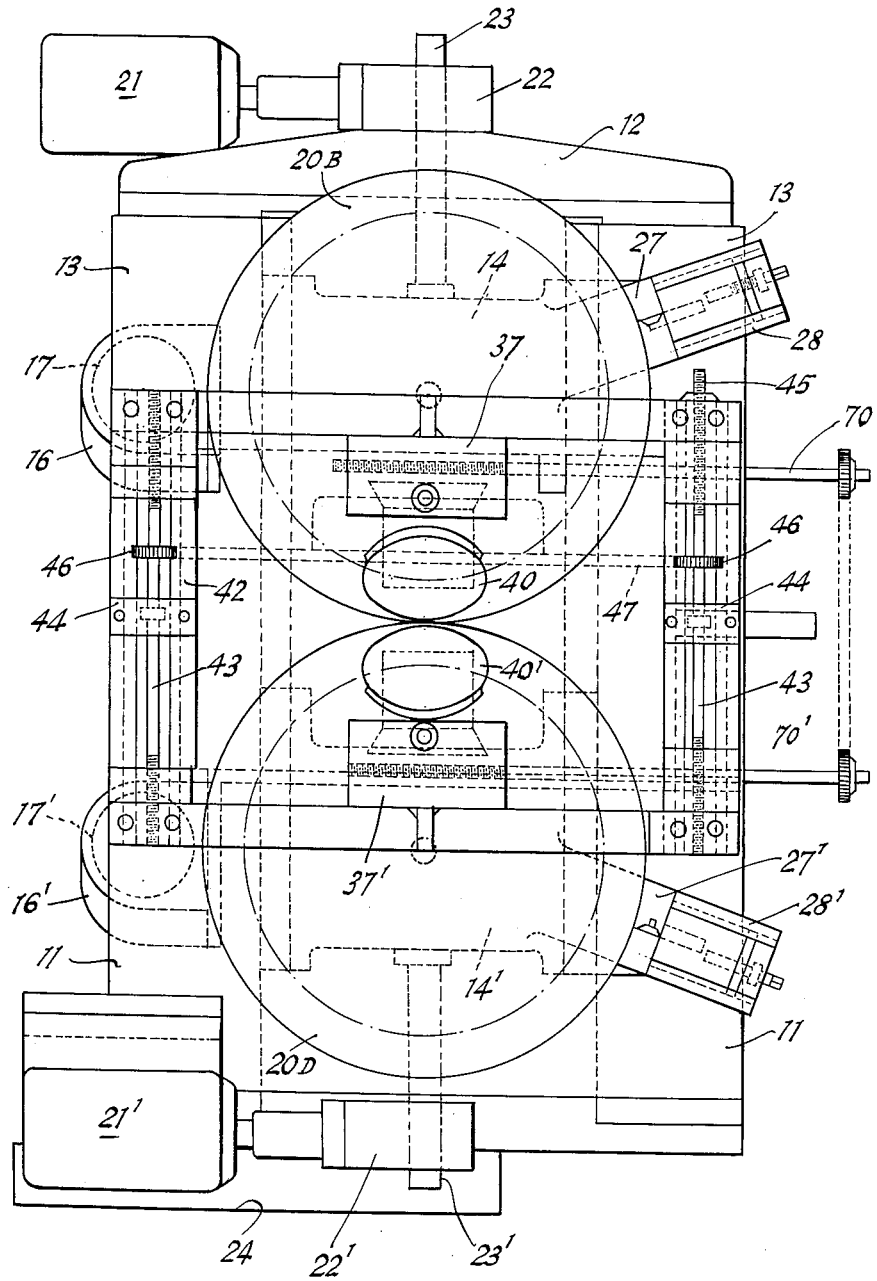
FIG. 2 is a front elevation view thereof.
Figure 3:
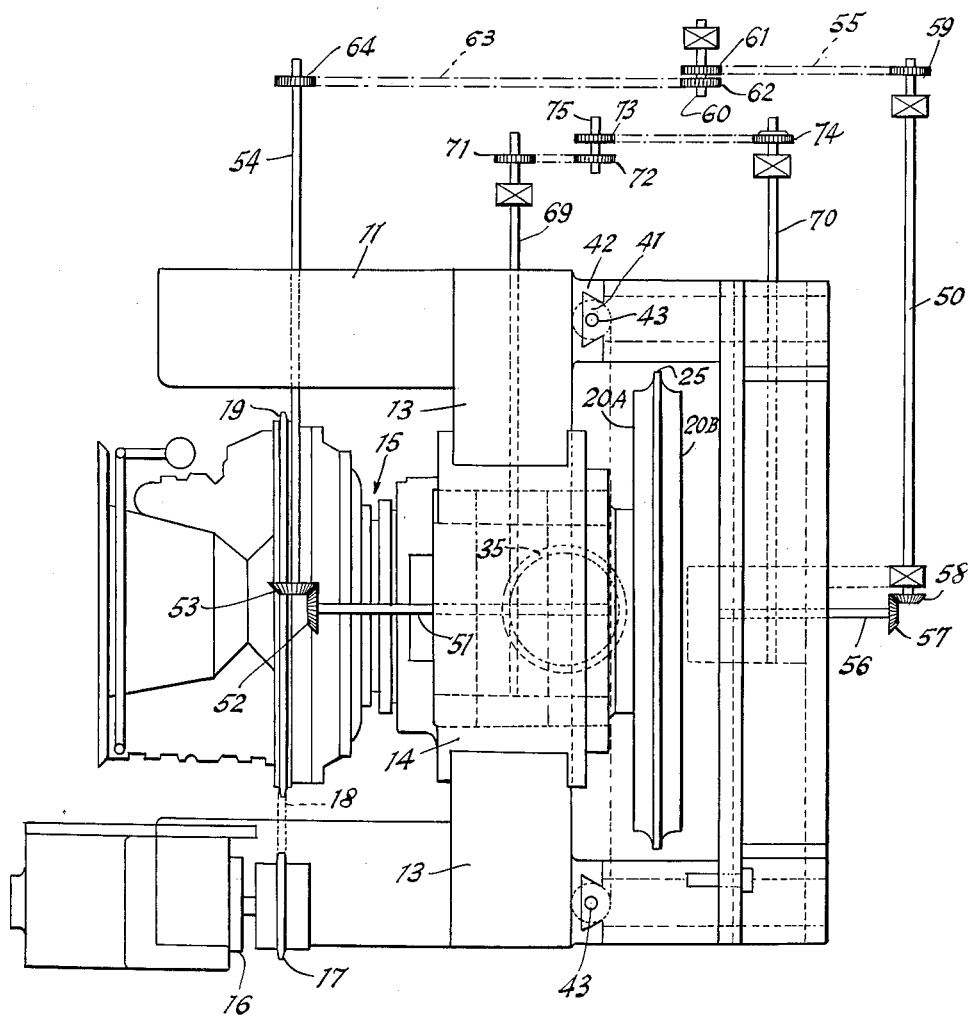
FIG. 3 is a plan view of the welder.

Referring to FIGS. 1, 2 and 3, the electric resistance welder 10 is mounted in a support frame including columns 11 and a top cross member 12 interconnecting the columns. The columns have facing inward extensions 13 forming vertical guides for slides 14, 14' in which are mounted rotary welding transformers 15, 15' which may be of the type illustrated and described in U.S. Patent 2,666,121, issued January 12, 1954, to E. W. Allardt. As described in said patent, each rotary welding transformer includes a single turn secondary winding comprising concentric inner and outer cylindrical or tubular members telescoped over each other with dielectric material therebetween. These members are electrically connected at one end and, at their outer end, conjointly form tapered seats for a pair of rotary welding electrodes 20 secured together as a unit with a disk 25, 25' of dielectric material interposed therebetween. These electrodes are described more fully hereinafter.

Transformers 15, 15' may be rotated by means of electric motors 16, 16' mounted on columns 11 and having drive sprockets 17, 17' connected by chains 18, 18' to ring sprockets 19, 19' on the transformers. Vertical adjustment of the transformers 15, 15' is effected by motors 21, 21' driving gear reducers 22, 22' having rotatable nuts (not shown) threaded on screw shafts 23, 23' secured to slides 14, 14'. Motor 21 is mounted on top support 12 and motor 21' is mounted in a pit or recess 24.

The pairs of electrodes 20A, 20B and 20C, 20D are reversely disposed as compared to the usual electrode disposition used in forming the seam in ERW tubing.

Thus, while each electrode has an outwardly concave peripheral or work-contacting surface 26, the pairs of electrodes are so disposed that their surfaces 26 diverge from each other toward the electrode or transformer axis. The axes of the two transformers 15, 15' are in a common vertical plane, and the upper and lower pairs of electrodes are in vertical alignment laterally of the welder 10.

Each pair of electrodes forms the terminals of the secondary winding of its associated transformer, and the relative polarities of the four electrodes are such that electrodes 20A and 20C are at the same polarity, and electrodes 20B and 20D are at the opposite polarities. In the absence of unforeseen fluctuations in the power supply, electrodes 20A and 20B are at the same potential as electrodes 20C and 20D, respectively. Thus, under normal conditions of steady power supply, there is no current circulating between the two transformers 15 and 15'. The contact surfaces 26 of the electrodes are dressed by tools 27, 27' adjustably mounted in brackets 28, 28' on columns 11.

The electrodes 20A, 20B are arranged to engage the upper inner quadrants of a pair of metal tubes 30 fed through the welder 10 in a manner to be described, and pressed firmly against opposite longitudinal edges of a metal spacer strip 31 while the tubes are engaged by the welding electrodes. The lower electrodes 20C, 20D engage the lower inner quadrants of the tubes. The surfaces 26 extend through substantially 90° of arc.

The minimum spacing of the peripheries of electrodes 20A and 20B from the adjacent peripheries of electrodes 20C and 20D, respectively, is at least slightly in excess of the thickness of webs 31. Thus, none of the electrodes contact a strip or web 31. Consequently, the electric resistance welding currents flow over two parallel paths as follows: (1) electrode 20A, left tube 30, strip 31, right tube 30, electrode 20B; and (2) electrode 20C, left tube 30, strip 31, right tube 30, electrode 20D.

By providing two current flow paths, one adjacent the upper side of strip 30 and the other adjacent the lower side thereof, the current is distributed substantially uniformly of the vertical extent of the longitudinal edges of strip 31, thus resulting in a uniform resistance welding of the entire surfaces of the strip edges to the tubes 30. This is in contrast to the case where only a single pair of electrodes is used. In this case, the current flow is concentrated more to the upper (or lower) side of the strip with the result that the best weld is obtained between the strip and tube surfaces nearest the electrodes, with the weld decreasing in quality away from the electrodes. The use of two pairs of electrodes has the further advantage that the current is divided between the two sets of electrodes. Consequently, for a given required total current, the current density at the contact surfaces 26 is reduced substantially 50 percent as compared to the current density if only a single pair of electrodes were used.

Pressing of the tubes into firm contact with the longitudinal edges of strip 31 is effected by conjointly adjustable squeeze roll means including a single squeeze roll 35, engaging the outer surface of the left hand tube (FIG. 1) over substantially one-half of its circumferential extent, and a pair of squeeze rolls 40, 40' engaging the right hand tube 30 (FIG. 1). Roll 40 engages this latter tube over most of the upper outer quadrant and roll 40' engages it over most of the lower outer quadrant, the peripheries of rolls 40 and 40', at their closest approach, being separated by at least the thickness of webs 31.

Squeeze roll 35 is rotatably mounted on a vertical axis in a forked support 32 which is adjustable laterally of tubes 30 in a slide 33 in turn mounted for longitudinal adjustment in a support 34 extending between extensions 13 of columns 11. Squeeze roll 40 is mounted, for rotation in a plane extending at substantially 45° to the horizontal and vertical, in a depending bracket 36 which is slidably mounted, for adjustment laterally relative to tubes 30, in a slide 37 adjustable longitudinally of a cross member 38 secured at each end to slides 41 adjustable vertically in guides 42 along the front surfaces of corners 11.

Squeeze roll 35 is substantially fixed vertically of welder 10. Conjoint vertical adjustment of squeeze rolls 40 and 40' is effected by vertical shafts 43, rotatably mounted in thrust bearings in brackets 44 secured to columns 11 and fixed against vertical movement by the thrust bearings. The upper and lower ends of shafts 43 are threadedly engaged in slides 41, and the shafts are provided with sprockets 46 interconnected by a chain or the like 47. The upper end of one shaft 43 is squared, as at 45, for application of a suitable crank or the like for conjointly rotating both shafts 43. The upper and lower ends of each shaft are threaded in opposite directions so that, upon rotation of the shafts, squeeze rolls 40 and 40' are moved closer together or farther apart to accommodate different sized tubes. For this purpose, the squeeze rolls 35, 40 and 40' are made readily removable for exchange with other squeeze rolls having peripheral tube engaging surfaces corresponding to different sized tubes 30.

The lateral spacing of squeeze roll 35 from squeeze rolls 40 and 40' is effected in the following manner. A shaft 51 has an end threadedly engaged in support 32 for squeeze roll 35, the outer end of shaft 51 carrying a bevel gear 52 engaged with a bevel gear 53 on a shaft 54 extending longitudinally of the welder. Shafts 56, 56' are threaded into supports 36, 36' and fixed against axial movement relative to supports 37, 37'. The outer ends of shafts 56, 56' carry bevel gears 57, 57' engaged respectively with bevel gears 58, 58' on shafts 50 and 50' interconnected for conjoint operation by an endless chain extending over sprockets secured to the shafts, this interconnection being omitted to simplify the drawing. The other end of shaft 50 carries a sprocket 59 connected by a chain 55 to a sprocket 61 secured, for rotation with a sprocket 62, on a shaft 60. A chain 63 connects sprocket 62 to a sprocket 64 on the outer end of shaft 54. By the described arrangement, when either shaft is rotated, the squeeze rolls are moved laterally to increase or decrease the effective spacing therebetween.

Provision is also made for adjustment of the squeeze rolls longitudinally of the welder. A shaft 65 is threaded into support 32 and carries a sprocket 66 connected by a chain 67 to a sprocket 68 on a shaft 69'. Shafts 70 and 70' are threaded into slides 37 and 37', respectively, and are interconnected by chain and sprocket connections to each other. The outer end of shaft 69 carries a sprocket 71 connected by a chain to a sprocket 72 fixed to rotate with a sprocket 73 on a shaft 75. A chain connects sprocket 73 to a sprocket 74 on the outer end of shaft 70. When either shaft 69 or shaft 70 is rotated, the three squeeze rolls are moved in one direction or the other longitudinally of welder 10. The described adjustments provide for accurate setting of the distance between the squeeze rolls, for accurate adjustment of the squeeze rolls longitudinally of the welder relative to the common axial plane of the electrodes 20, and for ready adjustment of the vertical spacing between squeeze rolls 40 and 40' for accommodation of tubes of different diameter.

Figure 6:
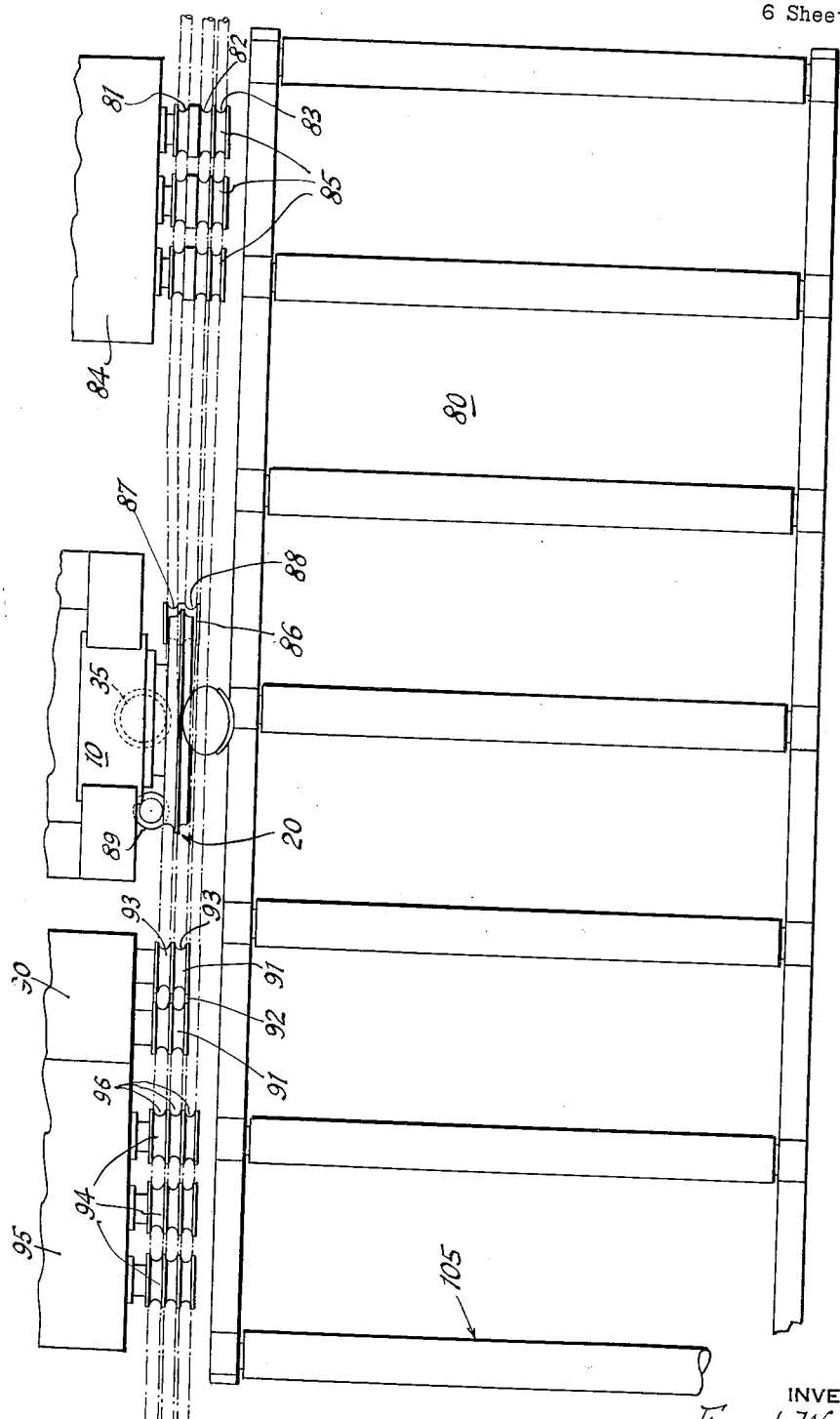
FIG. 6 is an enlargement of a portion of FIG. 5.
Figure 7:
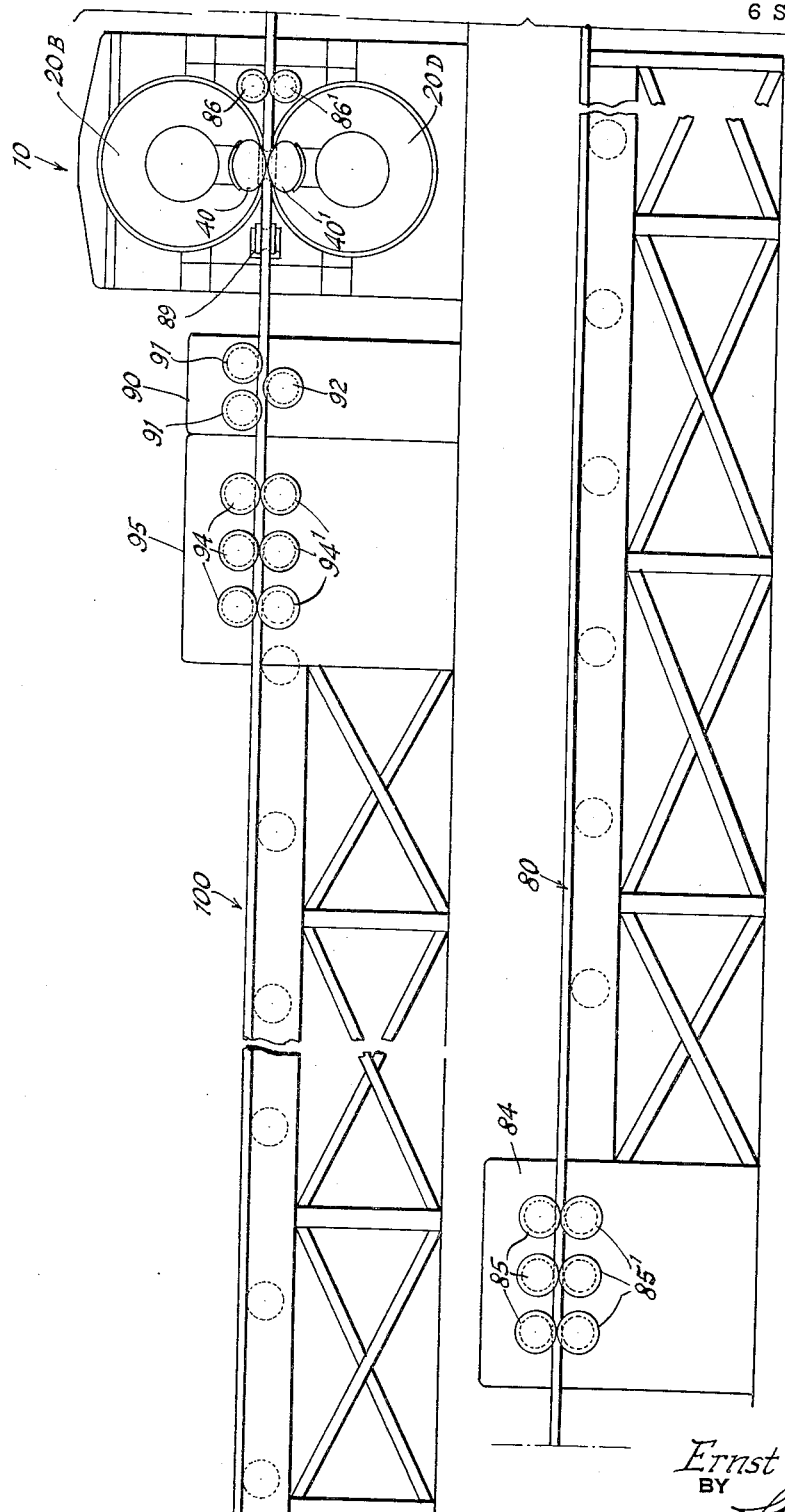
FIG. 7 is a front elevation view of the apparatus.

Referring to FIGS. 5, 6 and 7, the tubes are fed to welder 10 by reversible high speed, flat roller conveyor 80. This conveyor feeds the tubes to a guide roll stand 84 having, for example, three sets of guide rolls each comprising an upper roll 85 and a lower roll 85'. These rolls are interchangeable and have concave peripheral surfaces curved to fit the surfaces of the particular size of tubes being welded into a panel. It will be noted that each roll has three axially spaced tube engaging surfaces 81, 82 and 83, and that surface 81 is spaced a substantially greater distance from surface 82 than is surface 83. Surface 82 is longitudinally aligned with the surfaces 26 of electrodes 20B and 20D, whereas surface 81 is substantially offset laterally outwardly from surfaces 26 of electrodes 20A and 20C. The spacing of surfaces 82 and 83 is substantially equal to the width of strip 31 when resistance welded to adjacent tubes 30. The larger spacing of the surfaces 81 and 82 permits the strip 31 to be positioned between the tubes on these surfaces. The purpose of this arrangement will be set forth in the description of the operation of the apparatus.

From rolls 85, the tubes are fed to a pair of guide rolls 86, 86' each having a pair of concave, tube engaging, peripheral portions 87, 88 spaced axially a distance slightly greater than the width of strip 31. Rolls 86, 86' engage the tubes just before the latter enter electrodes 20. The welded tubes leaving the electrodes are engaged by a closing roll 89 rotatable in a horizontal plane.

The newly joined pair of tubes and the strip therebetween then enter a straightening roll stand 90 comprising a pair of longitudinally spaced upper rolls 91 and a lower roll 92 longitudinally between the upper rolls. Both the upper rolls and the lower roll have axially adjacent pairs of concave, tube-engaging peripheral surfaces 93. Rolls 91 and 92 engage only the two tubes which have been passed through the welder, and are relatively adjustable to provide the desired degree of straightening. A pull out roll stand 95, comprising several pairs of upper and lower rolls 94, 94' having three axially adjacent concave peripheral surfaces 96 to engage the two newly welded tubes and the next adjacent tube, moves the panel onto a flat reversible, high speed roller conveyor 100.

When the trailing end of the panel has emerged from roll stand 95, pusher means 97 are operated to move the panel laterally of conveyor 100 to clear welder 10. Conveyor 100 is then activated to move the panel to the right (FIGS. 5, 6 and 7) onto flat high speed reversible roller conveyor 105 which returns the panel to conveyor 80 where pushers 98 move the panel laterally back to its starting position. The sequence of panel movement may be made automatic by the use of suitably located stops or limit switches engaged by the panel.

In a preferred sequence of adding tubes to the first-joined pair of tubes to form the panel, successive tubes are added alternately to opposite sides of the panel. This counteracts or balances any heat engendered stresses tending to warp the panel parallel to its general plane. Warpage at right angles to the plane of the panel can be easily corrected by the usual tube straightening techniques as the stiffness of the panel in a direction normal to its plane is only a fraction of its stiffness in a direction parallel to its plane.

In a typical sequence, for example, tubes 30A and 30B, with strip 31A, are passed through welder 10 to electric resistance weld the tubes to the opposite edges of the strip. In the next pass through welder 10, tube 30C is joined to tube 30A by strip 31B. Before the next pass, the panel is turned over, side for side, by any suitable means such as an overhead crane. Tube 30D is then joined to tube 30B by strip 31C. The panel is again turned over between passes, and tube 30E is joined to tube 30C by strip 31D. The sequence is continued until a panel of the desired width has been formed. For example, typical panels may be 6 to 8 feet wide and 40 to 60 feet long, and may comprise tubes sized from 1 inch to 3½ inches nominal diameter electric resistance welded together by strips or webs ½ inch wide and ¼ inch thick. The foregoing examples are cited merely for exemplary purposes and are in no way limiting.

While a specific embodiment of the invention has been shown and described in detail to illustrate the application of the invention principles, it will be understood that the invention may be embodied otherwise without departing from such principles.

What is claimed is:

1. Apparatus for forming an integrated multiple tube panel composed of laterally spaced relatively elongated metal tubes integrally united by a longitudinal metal web between adjacent tubes electric resistance welded along its opposite side edges to the adjacent tubes; said apparatus comprising, in combination, a first pair of coaxial rotary electrodes mounted in juxtaposed electrically insulated relation and connected to opposite polarity terminals of a source of welding potential; a second pair of coaxial rotary electrodes mounted in juxtaposed electrically insulated relation and connected to opposite polarity terminals of a source of welding potential; said two pairs of electrodes being in vertically adjacent relation, and correspondingly located electrodes of the two pairs being in substantial diametrical alignment vertically and laterally and being at the same relative polarity; each electrode having a curved tube engaging peripheral surface and the tube engaging surfaces of the electrodes of each pair diverging from each other in a direction toward the electrode axis whereby the electrodes of one pair engage the upper inner quadrants throughout substantially 90 degrees of arc, and the electrodes of the other pair engage the lower inner quadrants throughout substantially 90 degrees of arc, of a pair of tubes moved in laterally spaced relation between the two pairs of electrodes; first guide means constructed and arranged to feed a pair of metal tubes in predetermined laterally spaced relation to said two pairs of electrodes; second guide means constructed and arranged to guide an elongated metal strip toward said electrodes between said tubes; squeeze roll means engaging the outer surfaces of said tubes as the tubes engage the electrodes to press said tubes firmly against the opposite side edges of said strip for flow of welding current from one electrode of each pair into one tube, through the strip and through the other tube to the other electrode of the associated pair to simultaneously electric resistance weld both tubes to opposite side edges of said strip; and transfer means receiving the joined tubes from said electrodes and constructed and arranged to return the joined tubes to a position in advance of said guiding means but laterally offset, by the amount of such predetermined lateral spacing, from the initial position for guiding of one joined tube and an additional tube, in such predetermined laterally spaced relation, to said two pairs of electrodes for electric resistance weld uniting of another strip and said additional tube to said one joined tube.

2. Apparatus for forming an integrated multiple tube panel composed of laterally spaced relatively elongated metal tubes integrally united by a longitudinal metal web between adjacent tubes electric resistance welded along its opposite side edges to the adjacent tubes; said apparatus comprising, in combination, a first pair of coaxial rotary electrodes mounted in juxtaposed electrically insulated relation and connected to opposite polarity terminals of a source of welding potential; a second pair of coaxial rotary electrodes mounted in juxtaposed electrically insulated relation and connected to opposite polarity terminals of a source of welding potential; said two pairs of electrodes being in vertically adjacent relation, and correspondingly located electrodes of the two pairs being in substantial diametrical alignment vertically and laterally and being at the same relative polarity; each electrode having a curved tube engaging peripheral surface and the tube engaging surfaces of the electrodes of each pair diverging from each other in a direction toward the electrode axis whereby the electrodes of one pair engage the upper inner quadrants throughout substantially 90 degrees of arc, and the electrodes of the other pair engage the lower inner quadrants throughout substantially 90 degrees of arc, of a pair of tubes moved in laterally spaced relation between the two pairs of electrodes; first guide means constructed and arranged to feed a pair of metal tubes in pre-determined laterally spaced relation to said two pairs of electrodes; second guide means constructed and arranged to guide an elongated metal strip toward said electrodes between said tubes; squeeze roll means engaging the outer surfaces of said tubes as the tubes engage the electrodes to press said tubes firmly against the opposite side edges of said strip for flow of welding current from one electrode of each pair into one tube, through the strip and through the other tube to the other electrode of the associated pair to simultaneously electric resistance weld both tubes to opposite side edges of said strip; and transfer means receiving the joined tubes from said electrodes and constructed and arranged to return the joined tubes to a position in advance of said guiding means but laterally offset, by the amount of such predetermined lateral spacing, from the initial position for guiding of one joined tube and an additional tube, in such predetermined laterally spaced relation, to said two pairs of electrodes for electric resistance weld uniting of another strip and said additional tube to said one joined tube.

3. Apparatus for forming an integrated multiple tube panel composed of laterally spaced relatively elongated metal tubes integrally united by a longitudinal metal web between adjacent tubes electric resistance welded along its opposite side edges to the adjacent tubes; said apparatus comprising, in combination, a first pair of coaxial rotary electrodes mounted in juxtaposed electrically insulated relation and connected to opposite polarity terminals of a source of welding potential; a second pair of coaxial rotary electrodes mounted in juxtaposed electrically insulated relation and connected to opposite polarity terminals of a source of welding potential; said two pairs of electrodes being in vertically adjacent relation, and correspondingly located electrodes of the two pairs being in substantial diametrical alignment vertically and laterally and being at the same relative polarity; each electrode having a curved tube engaging peripheral surface and the tube engaging surfaces of the electrodes of each pair diverging from each other in a direction toward the electrode axis whereby the electrodes of one pair engage the upper inner quadrants throughout substantially 90 degrees of arc, and the electrodes of the other pair engage the lower inner quadrants throughout substantially 90 degrees of arc, of a pair of tubes moved in laterally spaced relation between the two pairs of electrodes; first guide means constructed and arranged to feed a pair of metal tubes in pre-determined laterally spaced relation to said two pairs of electrodes; second guide means constructed and arranged to guide an elongated metal strip toward said electrodes between said tubes; a pair of squeeze rolls engaging the outer surface of one of said tubes, each roll engaging said one tube over the major portion of a quadrant of the surface thereof outwardly of said electrodes; said rolls being mounted for rotation in planes diverging outwardly of said one tube at substantially equal angles to the common diametric plane of said tubes, and the peripheries of said rolls at the outer surface of said one tube being spaced by an amount at least equal to the thickness of said strip; squeeze roll means engaging the outer surface of the other of said tubes, over substantially its complete semi-circumferential extent, laterally opposite said pair of squeeze rolls; said pair of squeeze rolls and said squeeze roll means engaging the outer surfaces of said tubes as the tubes engage the electrodes to press said tubes firmly against the opposite side edges of said strip for flow of welding current from one electrode of each pair into one tube, through the strip and through the other tube to the other electrode of the associated pair to simultaneously electric resistance weld both tubes to opposite side edges of said strip; and transfer means receiving the joined tubes from said electrodes and constructed and arranged to return the joined tubes to a position in advance of said guiding means but laterally offset, by the amount of such predetermined lateral spacing, from the initial position for guiding of one joined tube and an additional tube, in such predetermined laterally spaced relation, to said two pairs of electrodes for electric resistance weld uniting of another strip and said additional tube to said one joined tube; the strip uniting the previously joined tubes passing between said squeeze rolls with the other previously joined tube passing outside said pair of squeeze rolls.

4. Apparatus for forming a tubular component composed of laterally spaced relatively elongated metal tubes integrally united by a longitudinal metal web between adjacent tubes electric resistance welded along its opposite side edges to the adjacent tubes; said apparatus comprising, in combination, a first pair of coaxial rotary electrodes mounted in juxtaposed electrically insulated relation and connected to opposite polarity terminals of a source of welding potential; a second pair of coaxial rotary electrodes mounted in juxtaposed electrically insulated relation and connected to opposite polarity terminals of a source of welding potential; said two pairs of electrodes being in vertically adjacent relation, and correspondingly located electrodes of the two pairs being in substantial diametrical alignment vertically and laterally and being at the same relative polarity; each electrode having a curved tube engaging peripheral surface and the tube engaging surfaces of the electrodes of each pair diverging from each other in a direction toward the electrode axis whereby the electrodes of one pair engage the upper inner quadrants throughout substantially 90° of arc, and the electrodes of the other pair engage the lower inner quadrants throughout substantially 90° of arc, of a pair of tubes moved in laterally spaced relation between the two pairs of electrodes; first guide means constructed and arranged to feed a pair of metal tubes in predetermined laterally spaced relation to said two pairs of electrodes; second guide means constructed and arranged to guide an elongated metal strip toward said electrodes between said tubes; and squeeze roll means engaging the outer surfaces of said tubes as the tubes engage the electrodes to press said tubes firmly against the opposite side edges of said strip for flow of welding current from one electrode of each pair into one tube, through the strip and through the other tube to the other electrode of the associated pair to simultaneously electric resistance weld both tubes to opposite side edges of said strip, said squeeze roll means including a pair of squeeze rolls engaging the outer surface of one of said tubes; said rolls being mounted for rotation in planes diverging outwardly of said one tube at substantially equal angles to the common diametric plane of said tubes, and the peripheries of said rolls at the outer surface of said one tube being spaced by an amount at least equal to the thickness of said strip.

5. Apparatus for forming a tubular component composed of laterally spaced relatively elongated metal tubes integrally united by a longitudinal metal web between adjacent tubes electric resistance welded along its opposite side edges to the adjacent tubes; said apparatus comprising, in combination, a first pair of coaxial rotary electrodes mounted in juxtaposed electrically insulated relation and connected to opposite polarity terminals of a source of welding potential; a second pair of coaxial rotary electrodes mounted in juxtaposed electrically insulated relation and connected to opposite polarity terminals of a source of welding potential; said two pairs of electrodes being in vertically adjacent relation, and correspondingly located electrodes of the two pairs being in substantial diametrical alignment vertically and laterally and being at the same relative polarity; each electrode having a curved tube engaging peripheral surface and the tube engaging surfaces of the electrodes of each pair diverging from each other in a direction toward the electrode axis whereby the electrodes of one pair engage the upper inner quadrants throughout substantially 90° of arc, and the electrodes of the other pair engage the lower inner quadrants throughout substantially 90° of arc, of a pair of tubes moved in laterally spaced relation between the two pairs of electrodes; first guide means constructed and arranged to feed a pair of metal tubes in predetermined laterally spaced relation to said two pairs of electrodes; second guide means constructed and arranged to guide an elongated metal strip toward said electrodes between said tubes; and squeeze roll means engaging the outer surfaces of said tubes as the tubes engage the electrodes to press said tubes firmly against the opposite side edges of said strip for flow of welding current from one electrode of each pair into one tube, through the strip and through the other tube to the other electrode of the associated pair to simultaneously electric resistance weld both tubes to opposite side edges of said strip, said squeeze roll means including a pair of squeeze rolls engaging the outer surface of one of said tubes, each roll engaging said one tube over the major portion of a quadrant of the surface thereof outwardly of said electrodes; said rolls being mounted for rotation in planes diverging outwardly of said one tube at substantially equal angles to the common diametric plane of said tubes, and the peripheries of said rolls at the outer surface of said one tube being spaced by an amount at least equal to the thickness of said strip.

References Cited in the file of this patent

UNITED STATES PATENTS

| | | |
|---|---|---|
| 1,521,857 | Blum | Jan. 6, 1925 |
| 1,542,984 | Blum | June 23, 1925 |
| 1,660,425 | Murray | Feb. 28, 1928 |
| 1,844,407 | Murray | Feb. 9, 1932 |
| 2,381,742 | Guirl | Aug. 7, 1945 |
| 2,537,503 | Abbey | Jan. 9, 1951 |
| 2,719,210 | Chapman | Sept. 27, 1955 |

FOREIGN PATENTS

| | | |
|---|---|---|
| 932,183 | France | Nov. 17, 1947 |